Oct. 3, 1961  L. SPITZER, JR  3,002,912
REACTORS
Filed Dec. 24, 1957
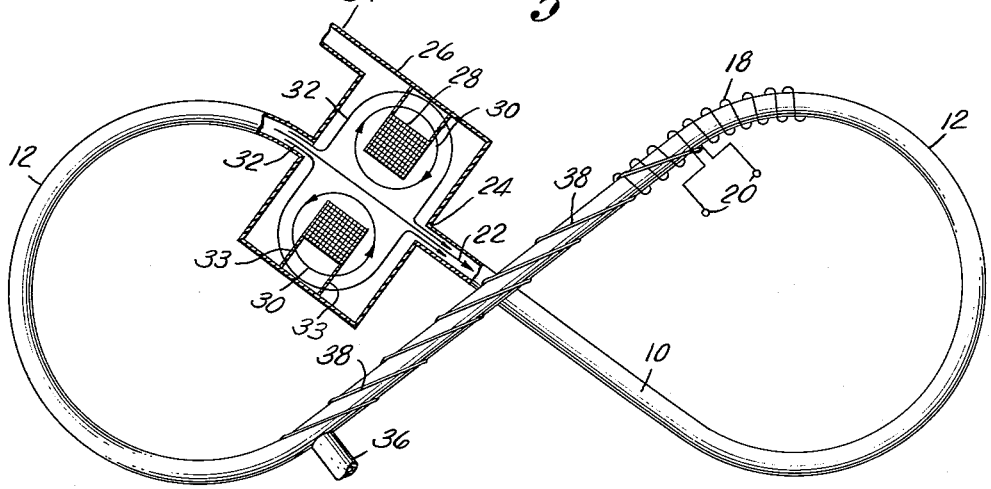
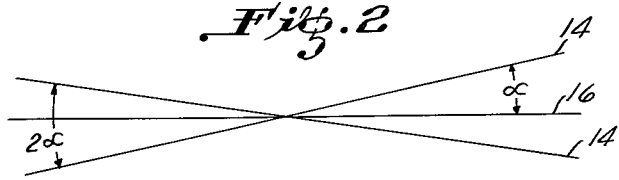
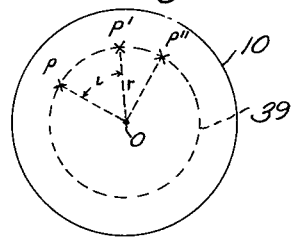
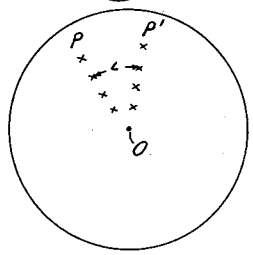
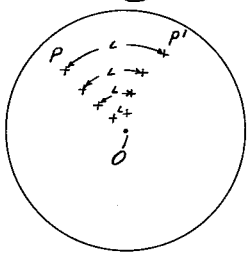
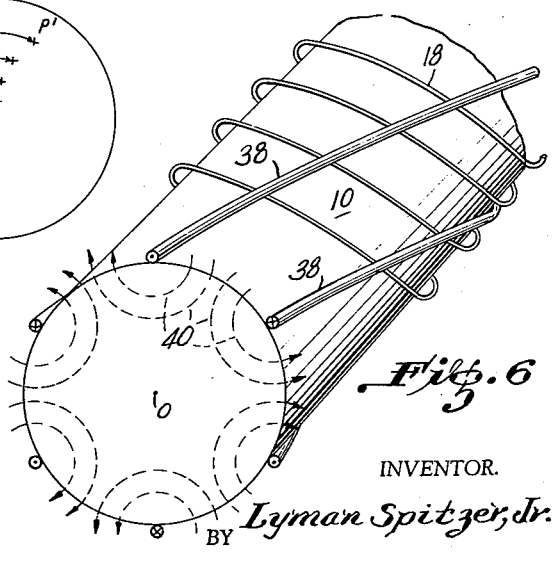
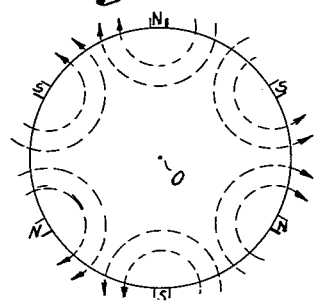
INVENTOR.
BY *Lyman Spitzer, Jr.*

United States Patent Office 3,002,912
Patented Oct. 3, 1961

3,002,912
REACTORS
Lyman Spitzer, Jr., Princeton, N.J., assignor to the United States of America as represented by the United States Atomic Energy Commission
Filed Dec. 24, 1957, Ser. No. 705,071
11 Claims. (Cl. 204—154.2)

This invention relates generally to high temperature reactors and more particularly to the methods of and apparatus for controlling and confining high temperature reactions within a reactor of the stellarator type.

The present invention is a continuation in part of the invention disclosed and claimed in my prior and co-pending application for Reactors, filed by me on July 31, 1951, Serial No. 239,419, which co-pending application is incorporated herein by reference, and which application has issued as Patent 2,910,414.

One embodiment of the referenced stellarator consists of a reactor container in the form of an endless tube in which the high temperature reactant materials or particles (referred to hereinafter in this specification and the appended claims as "reactants") are confined and in which nuclear reaction energy is generated and released. One example of a reactant material is deuterium. The changed form of the reactants created by the high temperature reactions will be referred to hereinafter in this specification and in the appended claims as "reacted particles."

In the referenced embodiment, the reactor tube is bent into the form of a figure 8, with the circular end loops thereof positioned in planes that are parallel to each other or the planes of the end loops may be inclined to each other and/or at angles to the horizontal. In the walls of the tube are at least one hole through which the reactants are fed into the tube and at least one gap through which reacted particles are withdrawn.

Around the tube and coaxially therewith is wound an electromagnetic coil which is connected to a D.C. source, the magnetic field produced thereby confining the plasma or ionized reactant particles to the axial portion of the tube as the ionized reactants are moved by the magnetic field helically along, and spirally gyrating about, individual lines of force. This coil will be referred to in this specification and in the appended claims as the "confining coil." At the said gap in the walls of the tube is positioned a divertor which consists of a space formed by expanding radially the walls of the tube and an electromagnetic coil therein, which coil may be connected to the same said D.C. source to produce a magnetic field radially the tube. This latter magnetic field diverts the lines of force near the walls of the tube, and the reactant particles carried thereby, into the expanded space radially outward the gap. In this space the reacted particles collide with the walls of the space and become dissociated from the lines of force and are mechanically removed from the space by a conventional pump. Thus any ion which approaches the tube wall in a stellarator, diffusing across the magnetic field as a result of collisions, etc., will enter the divertor and be neutralized there before it can hit the wall of the main reaction tube.

Because of the inhomogeneity of the magnetic field in a stellarator, the charged particles drift across the lines of force. (See H. Alfven, Cosmical Electrodynamics, Oxford Press, 1950, chapter 2, and L. Spitzer, Physics of Fully Ionized Gases, Interscience Publishers, chapter 1.) Particles of opposite sign drift in opposite directions, producing an accumulation of electric charge which can not easily flow across the magnetic field, and which produces electric fields that impair the confinement of the gas. In the figure 8 geometry, the particle drifts are in the opposite directions in the two curving end sections so that positive ions that drift up in one end section drift down in the other. Thus a tendency for positive charge to accumulate in one end section will be cancelled out by the tendency for opposite charges to accumulate on the same line of force in the other end section, since electric charges can readily flow along a line of force. Thus, electric fields will not tend to be produced with a figure 8 geometry.

*Rotational transform*

A greater cancellation of these fields is achieved in the referenced stellarator when the end loops are inclined to each other on opposite sides of the horizontal plane. It has been found that with this configuration a line of force which intersects a cross-sectional plane in a certain point will, after one circuit around the stellarator, intersect the same plane not in the same point, but in some other point. One and only one line of force will always intersect the cross-sectional plane in the same point and that line of force is called the "magnetic axis" of the tube. The successive intersections of any line of force, other than the magnetic axis, with the cross-sectional plane rotate by an angle around the magnetic axis. This rotation of successive intersection points, when a single line of force is followed for many circuits around a stellarator, is called a "rotational transform," and the angle of rotation is called the "transform angle." It has been found that if the two end loops of stellarator are inclined to each other, and each loop being inclined at the angle $\alpha$ to the horizontal, the transform angle $\iota$ will be equal to $4\alpha$.

When a rotational transform is present, a single line of force, intersecting a cross-sectional plane an infinite number of times, traces out a closed curve in the cross-sectional plane. In space, then, a single line of force will trace out an entire surface.

Since an electric current can readily flow along a line of force, any excess of charge anywhere on the surface will quickly be averaged out over the entire surface.

*Hydromagnetic instability*

When an ionized gas is confined in the axial region of a stellarator tube, with a much lower pressure or density near the tube wall, a radial interchange of lines of force may take place, with a movement of the particles to the region of a lower density; in this motion the magnetic lines of force are dragged along with the particles. With such movements of lines of force, the total potential energy of the system is reduced, provided that the tube and the tube axis are curved, or the magnetic field in some sections of the tube differs somewhat from its value in others. (See A.E.C. report WASH–289, pp. 343–350.) The decreased potential energy goes into kinetic energy, and the reactant particles near the center of the tube move out at an accelerating rate, thus increasing wall losses. This effect is known as a "hydromagnetic instability." (See Rosenbluth and Longmire, Annals of Physics, 1, 120, 1957.)

It has been found that when a rotational transform is produced in a stellarator by the relative inclining of its end loops, the transform angle of a particular line of force is independent of its separation or radial distance $r$ from the magnetic axis. Such an independent transform angle loses some of its effectiveness when the higher densities of ionized reactants are being confined in a stellarator tube for while each charged particle tends to move in a helix around a particular line of force, apart from slow drift, it is possible for all the particles gyrating about a particular line of force, in a long section of the reaction tube, to move to the wall, carrying the particular line of force with them. The lines of force nearer the wall, and with fewer particles gyrating around them, move inward to take the place of those that have moved outward. In this way, particles can reach the wall even though they continue to gyrate around one particular line of force.

It has been discovered, however, that with normal operating pressures or densities in stellarators, this interchange in positions of the outer and inner lines of force is greatly reduced if the transform angle varies steeply with the distance $r$. Thus when one line of force, with all its family of gyrating electrons and positive ions, starts to move outward, the outer line of force can not move in to take its place, since the outer and inner lines are no longer exactly parallel. If the transform angle $\iota$ increases sharply with increasing distance $r$ from the magnetic axis, the outer lines of force will wind helically about the magnetic axis with a pitch that decreases sharply with increasing $r$ and the outer line of force, with its gyrating charged particles, cannot move in to take the place of the inner line without considerable bending. Thus the ionized gas can be stabilized against hydromagnetic instability by a radial variation of $\iota$.

It is the principal object of the invention to improve the effectiveness of the confining magnetic field of a stellarator by substantially counteracting the tendency of the more central magnetic lines of force in the stellarator tube to exchange positions with the magnetic lines of force nearer the walls of the tube.

It is another object of the invention to impose a transverse helical magnetic field on the confining magnetic field of a stellarator.

It is another object of the invention ot create cylindrical magnetic surfaces or magnetic shear tubes within a stellarator tube, the directions of the lines of force forming the surfaces nearer the walls of the tube being at an angle to the lines of force forming the surfaces nearer the magnetic axis of the tube.

It is another object of the invention to provide magnetic shear surfaces near the walls of a stellarator to assist in the confining of the nuclear reactions to the central axial portion of the tube.

It is another object of the invention to provide a multipolar transverse magnetic field in a stellarator system to produce a rotational transform.

It is another object of the invention to provide a multipolar transverse magnetic field in a stellarator system to produce a rotational transform, the transform angle varying steeply with the distance of the individual lines of force from the magnetic axis of the stellarator tube.

It is another object of the invention to reduce the radial interchange of lines of force of the confining magnetic field of a stellarator by causing the lines of force of the field at different distances from the magnetic axis of the tube to point in different directions.

Other objects of the invention will become apparent from the following description of a preferred embodiment of the invention, including the drawings made a part thereof, and in which:

FIGURE 1 is a plan view of a stellarator tubular container, showing straight central portions and end loop portions;

FIGURE 2 is a line sketch showing the positional relations of the planes of the end loops in the embodiment of a stellarator shown in FIGURE 1;

FIGURE 3 is a line cross-sectional schematic diagram of the container tube of the stellarator of FIGURE 1 and showing the points of intersection P P' P" . . . of a single line of force of a magnetic field as it intersects a cross-sectional plane upon successive circuits around the tube;

FIGURE 4 is a line cross-sectional schematic diagram of the container tube of the stellarator of FIGURE 1 and showing constant transform angles for lines of force at different distances from the magnetic axis of the tube;

FIGURE 5 is a diagram similar to that of FIGURE 4, but showing the transform angles of lines of force increasing steeply with increasing distances of the lines of force from the magnetic axis;

FIGURE 6 is a view partly in perspective and partly in cross-section of the container tube of the stellarator of FIGURE 1 and showing the relative positions of a plurality of electromagnetic coils wound helically along the stellarator tube and the multipolar field produced thereby;

FIGURE 7 is a cross-section view of the container tube of the stellarator of FIGURE 1 and showing the relative positions of a plurality of permanent magnet cores positioned around the stellarator tube and the multipolar magnetic field produced thereby.

Referring to the drawings, 10 represents the reactor tube of a stellarator, which tube is formed into a figure 8 with curved end loops 14, 12. The planes in which the end loops are positioned are indicated as at 14, 14 (FIGURE 2) and the horizontal plane is indicated as at 16. Each of the planes of the two end loops 12, 12 are at an angle $\alpha$, and on opposite sides, to the horizontal plane 16 and are an an angle of $2\alpha$ with each other.

Around and axial and throughout the entire length of tube 10 is wound the conventional confining electromagnetic coil 18 which is connected to a D.C. source 20. When a direct current flows through the confining coil 20 a magnetic field is produced axial the tube 10. The magnetic axis of this field is represented in FIGURE 1 by the arrow 22.

At one or more positions on the tube 10 is a gap 24 and a radially enlarged section 26, in which is positioned an electromagnetic coil 28. This coil is connected to a D.C. source, such as 20. When current flows through coil 28 a magnetic field is created such as indicated by lines 30, which field diverts the lines of force near the walls in tube 10, such as shown by lines 32, into the space in the enlarged section 26. In this space, the reactant particles gyrating about and along the lines of force 32 strike the inner walls of enlarged section 26 and divertor plates 33 and become dissociated from the lines of force 32. The divertor plates 33 are transparent to the lines of force 32, but are not transparent to the reactant particles. The particles are withdrawn from enlarged section 26 by a conventional pump connected to pipe 34 which leads into enlarged section 26. Thus most of the reacted particles near the walls of tube 10 are withdrawn by divertor coil 28, and before they strike the walls of said tube. There is thus formed in tube 10 a region of lower density of the reactant particles near the walls of the tube.

Fresh reactants are fed into tube 10 under pressure of a conventional pump connected to pipe 36 which leads into tube 10.

As stated hereinbefore, when the planes of the end loops 12 of tube 10 are at angles to each other, as shown in FIGURE 2, the points of consecutive intersections, P P' P" . . ., of a particular line of force on a cross-sectional plane of tube 10 are angularly separated by the rotational transform angle $\iota$. These successive points of intersection trace and develop a closed figure which is approximately a circle, as shown at 39. FIGURE 4 shows consecutive points of intersection of magnetic lines of force with a transverse plane of the tube when the transform angle is the same for the various lines of force at different distances from the magnetic axis of the tube.

Referring particularly to FIGURES 1 and 6, a plurality of wires 38 are wound helically and directly on tube 10 and may be positioned under or above the coil 18. These wires 38 are connected in pairs to a D.C. source such that the currents in adjacent wires flow in opposite directions, as indicated in the dots and crosses in FIGURE 6. There is thus formed a plurality of transverse magnetic fields along tube 10, the pattern of magnetic lines of force being indicated by the dash lines 40 in FIGURE 6. The pitch of the helix wires 38 is approximately five to twenty times the diameter of the tube 10. It is evident that the multipolar magnetic field, as indicated by lines 40, vanishes as it approaches the magnetic axis O. The transform angle produced by these helical windings also vanishes close to the axis O, and varies as the square of the distance from the axis O, for the three pairs of wires shown. With such multipolar helical transverse fields, the transform angle $\iota$ will vary steeply with distance, as shown in FIGURE 5 (see AEC Report NYO-7899, Section 4.1, 1957). In some embodiments, the rotational transform produced by the helical transverse fields may be sufficiently great so that the figure 8 shape may be dispensed with, and the stellarator tube shaped like a simple torus or doughnut.

*In operation*

The stellarator is operated in the same manner as is fully set forth in the referenced application with the additional step, for the objects as are set forth herein, of applying the transverse multipolar magnetic field to the tube at the same time and during the same period of time that the confining field is applied to the tube. The strength of the multipolar field at its maximum value near the walls of the tube should be approximately one tenth to one fifth that of the confining field.

There is thus disclosed a method of and apparatus for improving the controlling and the confining of high temperature reactions within a stellarator tube by applying to the tube a multipolar helical magnetic field in combination with the regular confining field, to cause the production of rotational transform angles that vary steeply with the distance from the magnetic axis of the tube and thereby produce concentric shear tubes of magnetic lines of force, the lines of force comprising one of such magnetic tubes being at an angle to the lines of force in adjacent magnetic tubes.

While the preferred embodiment of the invention has been illustrated and described by way of example, it will be obvious that changes may be made therein within the spirit and scope of the invention, and, therefore, the invention is not to be limited to the precise form herein claimed. As an example of such obvious changes, a plurality of wires may be substituted for the single wires as shown at 38 to form the three groups or three pairs of wires disclosed and two or four or more groups or pairs of wires may be used instead of the three pairs of wires disclosed.

What I claim is:

1. The method of operation of apparatus for stably confining high temperature ionized gas having a closed endless reaction tube with a divertor therein including: the applying of a confining magnetic field inside and axially said tube, and simultaneously therewith applying a multipolar magnetic field transverse to the axis of said tube.

2. The method of operation of apparatus for stably confining high temperature ionized gas having a closed endless reaction tube with a divertor therein including: the applying of a confining magnetic field inside and axially said tube, and simultaneously therewith applying a multipolar magnetic field transverse to the axis of said tube, the magnetic axes of component parts of said multipolar magnetic field being substantially at the wall of said tube.

3. The method defined in claim 1 and further characterized by the said multipolar field substantially vanishing in the vicinity of the axis of the said confining field.

4. The method defined in claim 1 and further characterized by the strength of said multipolar field increasing steeply with the distance of said portions from the magnetic axis of the tube.

5. The method of producing a radially variable rotational transform in the closed endless reactor tube having a divertor therein of apparatus for stably confining high temperature ionized gas comprising: maintaining a confining magnetic field within and axially said tube, and applying a multipolar magnetic field to said tube, the axes of the components of which field are spaced radially outward the axis of said confining field.

6. The method of producing a radially variable rotational transform in the closed endless reactor tube having a divertor therein of apparatus for stably confining high temperature ionized gas having circular end loops and intercrossing sections connecting said end loops, comprising: maintaining a confining magnetic field within and axially said tube, and applying a multipolar magnetic field to said tube, the strength of which field vanishes at the axis of said tube.

7. In apparatus for stably confining high temperature ionized gas having means forming a closed endless reactor tube with a divertor therein, the combination of a confining electromagnetic coil wound coaxially said tube, and means for applying a multipolar helical magnetic field transverse to the axis of said coil.

8. The combination defined in claim 7 and further characterized by the said means comprising a plurality of closed coils extending helically along said tube.

9. The combination defined in claim 7 and further characterized by the said means comprising a plurality of pairs of permanent electromagnets, extending helically along said tube.

10. In apparatus for stably confining high temperature ionized gas having a closed endless reactor tube with a divertor tube formed with semicircular end loops and intercrossing sections connecting said end loops, the combination of a confining electromagnetic coil wound coaxially said tube, and means for applying a multipolar helical magnetic field transverse to the axis of said coil, the pitch of said helical field being between five and twenty times the diameter of the tube.

11. In apparatus for stably confining high temperature ionized gas having a closed endless reactor tube with a divertor therein formed with semicircular end loops and interconnecting sections connecting said end loops, the combination of a confining electromagnetic coil wound coaxially said tube, and means for applying a multipolar helical magnetic field transverse to the axis of said coil, the strength of said helical field at the walls of the tube being between one-tenth and one-fifth that of the confining field.

References Cited in the file of this patent

UNITED STATES PATENTS 2,910,414    Spitzer                Oct. 27, 1959

OTHER REFERENCES

R. F. Post: Reviews of Modern Physics, vol. 28, No. 3, July 1956, pages 338, 339, 344, 345, 346, 347, 349, 359–362.

Atomics and Nuclear Energy, February 1958, pages 58, 59, "Thermonuclear Fission," British and American Progress Report.

The Washington Post and Times Herald, Dec. 2, 1957.

J. Nuclear Energy II, vol. 5, pp. 71–85, Pergammon Press, London.